Figure 1:
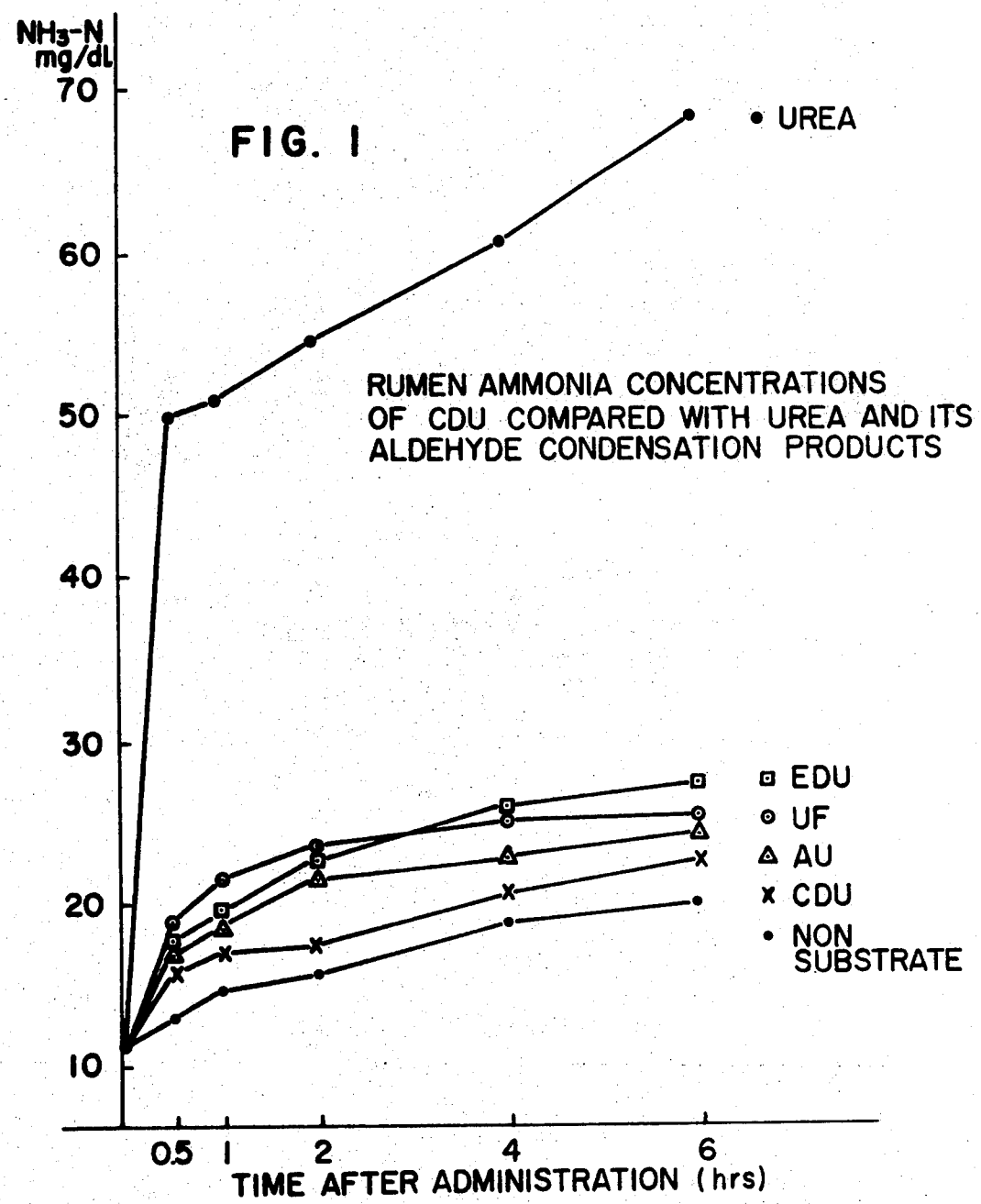

United States Patent

[11] 3,630,751

[72] Inventors Tsunezo Ushioda;
Tatsuo Koyanagi, both of Tokyo, Japan
[21] Appl. No. 16,457
[22] Filed Mar. 4, 1970
[45] Patented Dec. 28, 1971
[73] Assignee Chisso Corporation
Osaka, Japan
[32] Priority Jan. 21, 1966
[33] Japan
[31] 41/3384
Continuation-in-part of application Ser. No. 607,397, Jan. 5, 1967, now abandoned.
This application Mar. 4, 1970, Ser. No. 16,457

[54] FEED FOR RUMINANTS INCORPORATING 2-OXS-4-METHYL-6-UREIDOHEXAHYDROPYRIMIDINE
9 Claims, 2 Drawing Figs.

[52] U.S. Cl. .................................................. 99/2, 260/256.4, 71/92
[51] Int. Cl. .................................................. A23k 1/00
[50] Field of Search ..................................... 71/81, 92; 99/2, 2 N, 2 G; 260/256.4

[56] References Cited
UNITED STATES PATENTS
2,264,400  12/1941  Ott et al. ..................... 260/553
2,687,354   8/1954  Gribbins ....................... 99/2
3,190,742   6/1965  Brandeis et al. .............. 71/28

FOREIGN PATENTS
847,953  10/1939  France ......................... 260/553

OTHER REFERENCES
Uber Heterocyclen– Zigeuner et al., Eingegangen am 12 Oct. 1960, p. 34.
Organic Chemistry– Morrison & Boyd 2nd Ed., Allyn & Bacon Inc. Boston, 1966, p. 636.
Chemical Abstract, Mihara et al., 1963, PZN of Unsat. Aldehydes with Urea, p. 2996.
Chemical Abstract, Scheffer et al., Formation and Properties of Men– Vol. 1290, Acetaldehyde Condensates, 1957.

*Primary Examiner*—Norman Yudkoff
*Assistant Examiner*—Hiram H. Bernstein
*Attorney*—Fred C. Philpitt ABSTRACT: A feed for ruminants in which 2-oxo-4-methyl-6-ureidohexahydropyrimidine, a condensation product of urea and acetaldehyde or crotonaldehyde is incorporated, as a substitute for one part of the protein in said feed.

VFA PRODUCTION IN RUMEN JUICE FOLLOWING ADMINISTRATION OF CDU COMPARED WITH UREA AND ITS ALDEHYDE CONDENSATION PRODUCTS

FEED FOR RUMINANTS INCORPORATING 2-OXS-4-METHYL-6-UREIDOHEXAHYDROPYRIMIDINE

This application is a continuation-in-part of applicants' copending application, Ser. No. 607,397.

This invention relates to a novel feed containing 2-oxo-4-methyl-6-ureidohexahydropyrimidine (which will be hereinafter referred to CDU).

Urea has been widely used as an economical additive for feed for livestocks having rumination stomach such as cow, goat, sheep and the like, particularly as a substitute for the protein of a feed such as soybean cake, wheat bran or the like. However, if the application method is mistaken, it accompanies the danger of killing livestocks. Further it has a drawback in that when the concentration of urea in feed is slightly high, livestocks show distaste and do not have appetite.

It is an object of the present invention to provide a feed which is not only superior to urea in the effectiveness as a feed but also does not accompany the danger of killing livestocks or dislike of the latter encountered in the case of urea.

It has now been found by the comprehensive study of the present inventors that such an object can be attained by feed containing CDU.

As for the mechanism of urea being utilized as a feed additive, it is believed that the micro-organisms inhabiting the stomach of ruminants decompose and utilize urea to produce nitrogen-containing organic substances such as amino acids, proteins and the like which are digested and absorbed by livestocks, being thus utilized in the same degree as that of the conventional protein-containing materials.

CDU is a condensation product of urea and acetaldehyde or crotonaldehyde which belongs to a pyrimidine compound possessing an ureido radical (urea radical) as shown in the following formula.

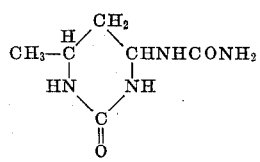

As shown in the following examples, CDU was fed to sheep by way of the same feeding method as that of urea in order to test its effectiveness as a feed.

In this test CDU showed the effectiveness far superior to urea as a feed. This was confirmed by the nitrogen balance in the nitrogen metabolism of sheep, the increase of weight, etc.

As regards the mechanism of CDU utilized as a feed, it may naturally be considered as in the case of urea to be due to the increase of protein in the micro-organisms living in the rumination stomach from the fact that the increase of micro-organisms in the stomachs of test animals is particularly pronounced in the cases of animals fed with CDU. On the other hand, as stated above, CDU is a kind of pyrimidine compounds and hence its effectiveness may be considered to be also due to the commonly accepted effectiveness of pyrimidine (which is a constituent of nucleic acid) for metabolism of animals. However, the exact detail of its mechanism is not yet perfectly clear. Whatever the mechanism is, the fact that CDU has a remarkable effectiveness as feed is the discovery of the present inventors.

The reason for high-grade safety of CDU as a feed compared with that of urea is due to the fact that it scarcely decomposes so quickly as urea in rumination stomach to evolve ammonia which brings trouble of gas formation and undesirable effect on the reaction of digestive solution of stomach.

The use of the condensation products of urea and aldehyde, particularly those of urea and formaldehyde as feedstocks for ruminants was discovered by Gribbins et al. (U.S. Pat. No. 2,687,354). CDU is a condensation product of urea and acetaldehyde but is a cyclic condensate possessing side chains. By the experiment hereinafter described in example 1, it has been discovered that CDU gives superior utilization which cannot be expected from ureaformaldehyde condensate (U.F.), urea-acetaldehyde linear condensate (AU) ethylidene diurea (EDU).

Following examples are given to illustrate the method of the present invention but they are by no means intended to limit its scope.

EXAMPLE 1

Fifteen ml. of rumen juice of goat was taken in a fermentation tube for anaerobic culture to which CDU or other substrates were added and subjected to culture at a constant temperature of 39° C. The amounts of ammonia-form nitrogen ($NH_3-N$) generated, consumption of substrates and volatile fatty acid generated were measured in order to show the superiority of the utilization of CDU in comparison with other substrates.

The amounts of the substrates added (converted to the amounts per 100 ml. rumen juice) were determined based upon the addition of 200 mg. urea per dl. (=93 mg. of urea form nitrogen) so as to give the same amount of each media in term of converted N amount.

The kinds of substrates used in experiments were as follows:

|  | Total Nitrogen (T.N.) |
|---|---|
| Urea | 46.6% |
| CDU | 32.5% |
| UF | 39.9% (condensation ratio of urea to formaldehyde) 3:1 |
| EDU | 38.2% |
| AU | 38.1% (Equimolar linear condensate of urea and acetaldehyde) |

Table 1 and FIG. 1 show rumen ammonia concentrations ($NH_3-N$ mg. per 100 ml. of rumen juice) of CDU administration compared with urea and its condensation products relative to elapse of time.

TABLE 1

Rumen ammonia concentrations ($NH_3-N$ mg. per 100 ml. of rumen juice) of CDU administration compared with urea and its aldehyde condensation products relative to elapse of time.

| Substrates | Non-substrate | Urea | CDU | UF | EDU | AU |
|---|---|---|---|---|---|---|
| Time, hrs.: |  |  |  |  |  |  |
| 0 | 10.9 | 10.9 | 10.9 | 10.9 | 10.9 | 10.9 |
| 0.5 | 13.3 | 50.0 | 15.9 | 18.4 | 17.9 | 17.1 |
|  |  | (46.7) | (2.6) | (5.1) | (4.6) | (3.8) |
| 1.0 | 14.2 | 51.0 | 17.1 | 21.8 | 19.2 | 19.0 |
|  |  | (46.8) | (2.9) | (7.6) | (5.0) | (4.8) |
| 2.0 | 16.5 | 54.5 | 17.8 | 23.5 | 22.9 | 21.6 |
|  |  | (45.0) | (2.3) | (8.0) | (7.4) | (6.1) |
| 4.0 | 18.3 | 60.5 | 20.5 | 25.1 | 26.8 | 23.3 |
|  |  | (42.2) | (2.2) | (6.8) | (8.5) | (5.0) |
| 6.0 | 19.9 | 68.1 | 22.1 | 25.5 | 27.4 | 24.8 |
|  |  | (48.3) | (2.2) | (5.6) | (7.5) | (4.9) |

NOTE.—( ): Shows $NH_3-N$ mg. free from that of non-substrate juice.

In FIG. 1, when urea is used, $NH_3$ is generated so rapidly as 50 mg. in 30 minutes, and 68 mg. in 6 hours whereas when EDU, UF, AU, CDU, or the like is used, generation of $NH_3$ is so slow as 15.9–18.4 mg. in 30 minutes and 22.1–27.4 mg. in 6 hours. The group of these materials show seemingly the same $NH_3$ generation. However, if the fact that values of $NH_3$ generation are considerably high is taken into consideration and respective values are subtracted (the values in the parentheses in the columns of table 1), the concentrations of rumen ammonia of the group of EDU, UF and AU are different from those of CDU. Accordingly, following two conclusions can be obtained.

1. The generation of $NH_3$ is exceedingly slow in case of CDU compared with the case of urea. It is not accompanied with so rapid generation of $NH_3$ as in case of urea and does not reach a high concentration.

2. CDU is slower than UF, EDU, or AU in the generation of $NH_3$ and superior as a donor of $NH_3$.

Table 2 shows the consumption (utilization by microbes) of CDU and comparative compounds in rumen juice relative to elapse of time.

TABLE 2

Consumption (utilization by microbes) of CDU in rumen juice relative to elapse of time. (Substrate-N mg. consumed/100 ml. of rumen juice)

| Time (hrs.) | Urea | Substrates CDU | UF | EDU |
|---|---|---|---|---|
| 1 | 6.2 | 5.3 | 4.8 | 5.9 |
| 2 | 10.1 | 19.2 | 9.9 | 9.8 |
| 3 | 11.1 | 22.9 | 10.9 | 11.0 |
| 4 | 12.1 | 16.7 | 9.8 | 11.9 |

In table 2, the consumption of N after elapse of 1 hour is in the order of urea>EDU>CDU>UF but after elapse of 2 hours, the order becomes CDU>urea>EDU>UF and after elapse of 4 hours, the result of CDU>(urea or EDU)>UF is obtained. Accordingly, a following conclusion can be obtained.

3. If the careers of substrate consumption are observed, CDU shows the largest value in the consumption of $NH_3$ compared with urea, EDU, UF, etc. in spite of its small amount of $NH_3$ generation.

Figure 2:
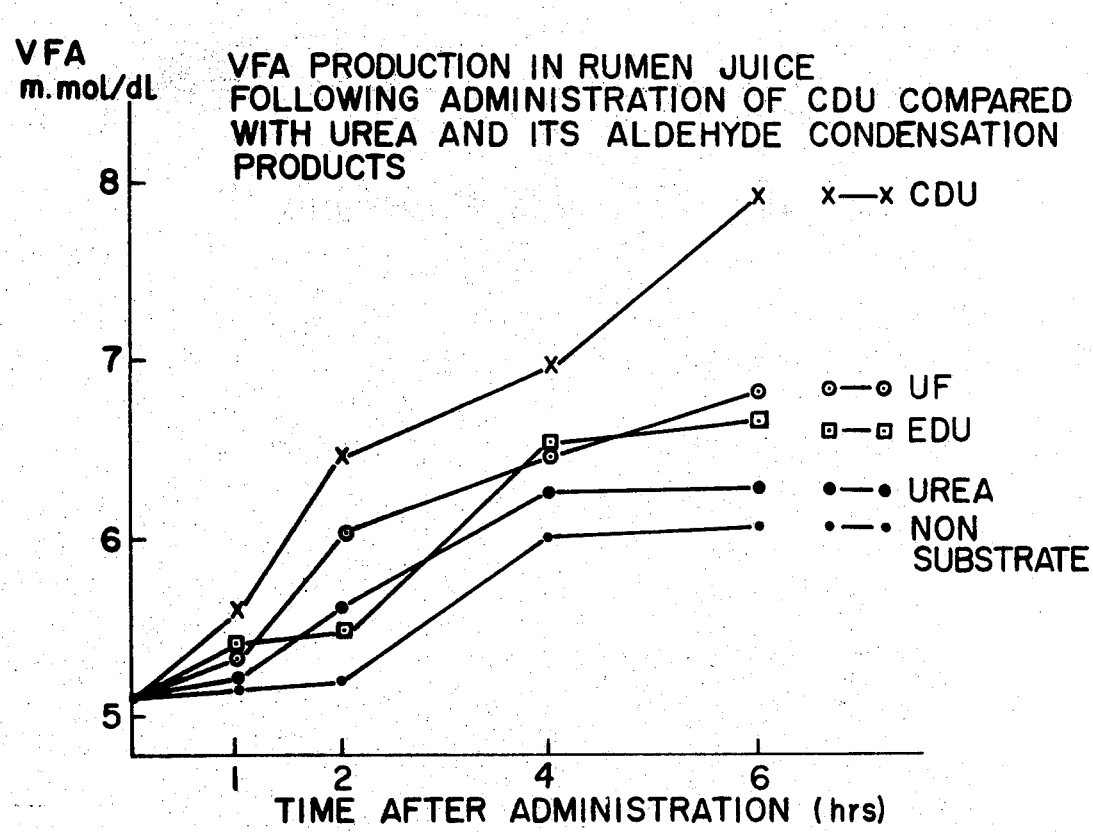

Table 3 and FIG. 2 show rumen volatile fatty acid (VFA) production in rumen juice (millimole/dl.) in case of CDU administration compared with the cases of urea and aldehyde condensation products thereof relative to elapse of time.

TABLE 3

Rumen VFA (volatile fatty acids) production in rumen juice (millimole/dl.) in case of CDU administration compared with urea and aldehyde condensation products thereof relative to elapse of time.

| Time (hrs.) | none | Urea | Substrates CDU | UF | EDU |
|---|---|---|---|---|---|
| 0 | 5.11 | " | " | " | " |
| 1 | 5.19 | 5.10 | 5.60 | 5.24 | 5.25 |
| 2 | 5.20 | 5.60 | 6.50 | 5.04 | 5.48 |
| 4 | 6.07 | 6.24 | 6.98 | 6.52 | 6.55 |
| 6 | 6.10 | 6.25 | 7.88 | 6.82 | 6.77 |

In FIG. 2, when urea is used, the VFA which are important factors showing the utilization efficiencies of substrates by microbes in rumen increases in relatively slow rate such as 5.20 mg. in 1 hour and 6.25 mg. in 6 hours. Whereas when UF or EDU is used, the VFA show similar tendency to that of urea in 1 and 2 hours but urea is evidently superior in 4 or 6 hours and when CDU is used, the VFA show exceedingly large values in each hour of 1, 2, 4, and 6 hours compared with other substances (UF and EDU).

4. Accordingly, it is concluded from the progress of VFA generation which is the important factor showing the utilization efficiency of substrates by microbes in rumen that CDU gives exceedingly large amount compared with known urea-aldehyde condensates such as UF and EDU regardless to say with urea. It is believed that this fact shows far better utilization of CDU by rumen microbes compared with other substrates.

The amount of CDU to be added to feed varies and hence must be properly decided accordingly to the kind and weight of ruminants. For sheep it is added in an amount of approximately 1 percent and for cow, greatly increased, for instance, in an amount of approximately 10 percent.

EXAMPLE 2

The effectiveness for feeding CDU to sheep was investigated.

The experiments were carried out on the nitrogen balance of nitrogen metabolism of sheep with regard to the sheeps fed with fundamental feed, those fed with a feed in which the major amounts of the exoleated soybean in the fundamental feed is replaced by urea and those fed with a feed in which the major amount of exoleated soybean in the fundamental feed is replaced by CDU. Namely, the amounts of nitrogen accumulated in the body where compared by subtracting the amount of nitrogen eliminated from the bodies in dungs and urines from the amount eaten.

Both the female and male sheeps were used and the comparisons of nitrogen balance and change of weights were carried out with regard to the case of fundamental feeds, that of the feeds containing urea and that of the feeds containing CDU.

The period of the feeding of the fundamental feed was set to 10 days. Thereafter in the case of male, the feeding of the feed containing urea was carried out for 10 days, returned to the fundamental feed for 10 days and then the feeding of the feed containing CDU was carried out for 10 days. In the case of female, at first the feeding of feed containing CDU and then that containing urea were carried out. The additions of urea and CDU were gradually increased for the first 3 days. The amounts listed in the table were fed from the 4th day and thereafter for 7 days. The compositions of the feeds (according to NRC standard maintenance feed of U.S.A.) are as follows:

| | Fundamental feed | Feed containing urea | Feed containing CDU |
|---|---|---|---|
| Orchard grass (Dactylis glomerata) | 800 g. | 800 g. | 800 g. |
| Wheat bran | 240 | 240 | 240 |
| Starch | — | 68 | 68 |
| Exoleated soybeans | 70 | 10 | 10 |
| Urea | — | 11 | — |
| CDU | — | — | 16 |

Note:

The amount of nitrogen of 70 g. exoleated soybeans is nearly equal to that of 11 g. urea and further nearly equal to that of 16 g. CDU.

The calorie of 70 g. exoleated soybeans is nearly equal to that of 68 g. starch.

Nitrogen balance (mean nitrogen value per day) and increase of weight

The case of female.

| | (Fundamental) feed→ | (Feed) containing CDU | (Fundamental) feed→ | (Feed) containing urea |
|---|---|---|---|---|
| N-amount eaten, g | 16.81 | 22.31 | 22.31 | 22.31 |
| N-amount in dung, g | 4.56 | 8.68 | 6.38 | 7.21 |
| N-amount in urine, g | 10.54 | 10.11 | 15.62 | 14.63 |
| N-accumulation, g | 1.71 | 3.52 | 0.31 | 0.47 |
| Weight, kg | 50.8→ | 53.6 (+2.8) | 55.8→ | 57.0 (+1.2) |

The case of male.

|  | Fundamental feed→ | Feed containing urea→ | Fundamental feed→ | Feed containing CDU |
|---|---|---|---|---|
| N-amount eaten, g | 16.81 | 22.31 | 22.31 | 22.31 |
| N-amount in dung, g | 5.11 | 7.34 | 6.88 | 8.05 |
| N-amount in urine, g | 9.33 | 11.35 | 14.69 | 13.24 |
| N-accumulation, g | 2.37 | +3.62 | 0.74 | 1.02 |
| Weight, kg | 35.5→ | 37.4 (+1.9) | 39.6→ | 43.0 (+3.4) |

|  | (1)→ Fundamental, g. | (2)→ Containing urea, g. | (1)→ Fundamental, g. | (3) Containing CDU, g. |
|---|---|---|---|---|
| N eaten | 9.70 | 10.49 | 10.77 | 10.11 |
| N in dung | 3.10 | 4.46 | 4.71 | 3.81 |
| N in urine | 5.06 | 3.94 | 3.35 | 3.35 |
| N accumulated | (+)1.54 | (+)2.09 | (+)2.71 | (+)2.95 |
| Weight of body, initial | 32.0 | 32.0 | 32.1 | 32.4 |
| On the last day | 32.0 | 32.1 | 32.4 | 32.7 |
| Increase of weight of body | 0.0 | 0.1 | 0.3 | 0.3 |

As evident from the above-mentioned table, in both the case of female and male the accumulated nitoren was great in CDU feeding and as for the weight increase CDU feeding affords greater values than urea feeding.

EXAMPLE 3

A female sheep (ewe) was subjected to this examination. There were used three kinds of feeds of (1) a fundamental feed, (2) a feed in which total exoleated soybean in the fundamental feed was replaced by urea, and (3) a feed in which total exoleated soybean in the fundamental feed was replaced by CDU.

The compositions of these feeds in a daily feeding amount were as follows:

|  | (1) Fundamental | (2) Feed containing urea | (3) Feed containing CDU |
|---|---|---|---|
| Orchardgrass | 800 g. | 800 g. | 800 g. |
| Wheat bran | 80 | 80 | 80 |
| Starch | — | 19 | 19 |
| Exoleated soybean | 20 | — | — |
| Urea | — | 3.2 | — |
| CDU | — | — | 4.5 |

Note:

1. The amount of N in 20 g. of exoleated soybean substantially corresponds to the amounts of N in 3.2 g. of urea or in 4.5 g. of CDU.

2. The calorie in 20 g. of exoleated soybean substantially corresponds to the calorie in 19 g. of starch.

Each of these feeds were fed to the animal to be tested, in the order of feed (1) → feed (2) → feed (1) → feed (3), every day and continuously, for each 1 week, respectively. Thus, the increase in the weight of the body and the amount of the coming in and out of N were observed by the measurements of the weight of body at the start and at the end of each period, and by the collection of dung and urine for the final 3 days during each period, followed by the analyses of N in the dung and urine.

Coming in and out of N, and weight of body

The feed containing CDU, (3) is apparently superior relative to the amount of accumulated N. It is also superior to the feed containing urea, relative to the increase in the weight of the body, and further it has a tendency of superiority to the fundamental feed (1).

What is claimed is:

1. A composition for the feeding of ruminants comprising nutritionally balanced quantities of carbohydrates, fiber, and protein and as a supplementary source of nitrogen from about 1 to about 10 percent by weight of the feed of 2-oxo-4-methyl-6-ureidohexahydropyrimidine.

2. The composition of claim 1 wherein the supplementary source of nitrogen is about 1 percent by weight based upon the composition of 2-oxo-4-methyl-6-ureidohexahydropyrimidine.

3. The composition of claim 1 wherein the supplementary source of nitrogen is about 10 percent by weight based upon the composition of 2-oxo-4-methyl-6-ureidohexahydropyrimidine.

4. The composition of claim 1 wherein said carbohydrates, fiber, and protein comprise orchard grass, wheat bran, starch, and exoleated soybeans.

5. A method for feeding ruminants which comprises providing a composition comprising nutritionally balanced quantities of carbohydrates, fiber, and protein and, as a supplementary source of nitrogen, from about 1 to about 10 percent by weight of the feed, of 2-oxo-4-methyl-6-ureidohexahydropyrimidine, and feeding said composition to said ruminants.

6. A method of claim 5 wherein the supplementary source of nitrogen is about 1 percent by weight based upon the composition of 2-oxo-4-methyl-6-ureidohexahydropyrimidine.

7. The method of claim 5 wherein the supplementary source of nitrogen is about 10 percent by weight based upon the composition of 2-oxo-4-methyl-6-ureidohexahydropyrimidine.

8. The method of claim 5 wherein said carbohydrate, fiber, and protein comprise orchard grass, wheat bran, starch, and exoleated soy beans.

9. The method of claim 5 wherein said ruminants are selected from the group consisting of sheet, goats, and cows.

* * * * *